US012721770B2

(12) United States Patent
Diodato et al.

(10) Patent No.: US 12,721,770 B2

(45) Date of Patent: Sep. 1, 2026

(54) METHOD OF REPOSITIONING SPINE SURGERY POSITIONERS

(71) Applicant: Allen Medical Systems, Inc., Batesville, IN (US)

(72) Inventors: Michael Philip Diodato, Fitchburg, MA (US); Ben W. Hertz, Littleton, MA (US)

(73) Assignee: Allen Medical Systems, Inc., Batesville, IN (US)

( * ) Notice: Subject to any disclaimer, the term of this patent is extended or adjusted under 35 U.S.C. 154(b) by 23 days.

(21) Appl. No.: 18/935,782

(22) Filed: Nov. 4, 2024

(65) Prior Publication Data

US 2025/0057714 A1 Feb. 20, 2025

Related U.S. Application Data

(63) Continuation of application No. 17/676,316, filed on Feb. 21, 2022, now Pat. No. 12,133,819.

(Continued)

(51) Int. Cl.

*A61G 13/08* (2006.01)
*A61G 13/00* (2006.01)

(Continued)

(52) U.S. Cl.

CPC ......... *A61G 13/08* (2013.01); *A61G 13/0054* (2016.11); *A61G 13/04* (2013.01);

(Continued)

(58) Field of Classification Search

CPC .... A61G 13/08; A61G 13/0054; A61G 13/04; A61G 13/101; A61G 13/122;

(Continued)

(56) References Cited

U.S. PATENT DOCUMENTS 3,844,550 A 10/1974 McGuire
5,484,393 A 1/1996 McCoy (Continued)

FOREIGN PATENT DOCUMENTS

CN 202844024 U 4/2013
CN 20448466 U 7/2015

(Continued)

OTHER PUBLICATIONS

"Lock." Dictionary.com, www.dictionary.com/browse/lock (Year: 2019).

(Continued)

*Primary Examiner* — Madison Matthews

(74) *Attorney, Agent, or Firm* — Barnes & Thornburg CUP

(57) ABSTRACT

A patient positioner for supporting a patient in a prone position includes a base plate, an adjustable platform movable relative to the base plate, a support assembly supported on the adjustable platform, a lateral constraint assembly positioned on the adjustable platform, and a position lock operable to selectively lock the adjustable platform relative to the base plate. The patient positioner is adjustable to adjust the position of the patient and to adjust the orientation of the patient's spine in the coronal and sagittal planes.

16 Claims, 11 Drawing Sheets

Related U.S. Application Data

(60) Provisional application No. 63/157,036, filed on Mar. 5, 2021.

(51) Int. Cl.
*A61G 13/04* (2006.01)
*A61G 13/10* (2006.01)
*A61G 13/12* (2006.01)

(52) U.S. Cl.
CPC ......... *A61G 13/101* (2013.01); *A61G 13/122* (2013.01); *A61G 13/123* (2013.01); *A61G 13/1245* (2013.01); *A61G 13/1265* (2013.01); *A61G 2200/325* (2013.01)

(58) Field of Classification Search
CPC .............. A61G 13/123; A61G 13/1245; A61G 13/1265; A61G 2200/325; A61G 13/1285; A61G 13/12; A61G 13/121; A61G 13/0036; A61G 13/1235; A61G 2210/50; A61G 13/129; A61G 2200/322
USPC ... 5/621, 600, 613, 632, 601, 624, 610, 617, 5/622, 607
See application file for complete search history.

(56) References Cited

U.S. PATENT DOCUMENTS

| | | | | |
|---|---|---|---|---|
| 5,680,861 | A | 10/1997 | Rohling | |
| 5,820,573 | A | 10/1998 | Ramos | |
| 6,934,987 | B2 | 8/2005 | Newkirk et al. | |
| 7,415,741 | B1 | 8/2008 | Wasley et al. | |
| 7,520,007 | B2 | 4/2009 | Skripps | |
| 7,520,008 | B2 | 4/2009 | Wong et al. | |
| 7,669,262 | B2 | 3/2010 | Skripps et al. | |
| 8,146,189 | B2 | 4/2012 | Yang et al. | |
| 10,105,274 | B2 | 10/2018 | Carn | |
| 10,492,973 | B2 | 12/2019 | Drake | |
| 10,588,808 | B2 | 3/2020 | Wheeler | |
| 12,133,819 | B2 | 11/2024 | Diodato et al. | |
| 2003/0167569 | A1 * | 9/2003 | Newkirk | A61G 13/12 5/613 |
| 2006/0248650 | A1 * | 11/2006 | Skripps | A61G 13/0054 5/624 |
| 2009/0012437 | A1 | 1/2009 | Tucker et al. | |
| 2010/0192300 | A1 | 8/2010 | Tannoury et al. | |
| 2012/0144589 | A1 | 6/2012 | Skripps et al. | |
| 2017/0079864 | A1 * | 3/2017 | Riley | A61G 13/123 |
| 2017/0135890 | A1 * | 5/2017 | DuBois | A61G 13/1295 |
| 2017/0216121 | A1 | 8/2017 | White | |
| 2017/0216122 | A1 | 8/2017 | White | |
| 2019/0133862 | A1 | 5/2019 | Norris | |
| 2022/0280367 | A1 | 9/2022 | Diodato et al. | |

FOREIGN PATENT DOCUMENTS

| | | | |
|---|---|---|---|
| CN | 210056664 | U | 2/2020 |
| CN | 210542278 | U | 5/2020 |
| WO | 2009076483 | A1 | 6/2009 |
| WO | 2021058488 | A1 | 4/2021 |

OTHER PUBLICATIONS

Instructions for User: Broadhead Mini Pegboard System, Feb. 8, 2021 (8 pages).
EP Search Report for European Patent Application No. 22159810.5-113, dated Jul. 19, 2022 (6 pages).

* cited by examiner

METHOD OF REPOSITIONING SPINE SURGERY POSITIONERS

PRIORITY CLAIM

This application is a continuation of U.S. patent application Ser. No. 17/676,316, filed Feb. 21, 2022, which claims benefit of claims priority under 35 U.S.C. § 119 (e) to U.S. Provisional Application No. 63/157,036, filed Mar. 5, 2021, which is expressly incorporated by reference herein.

BACKGROUND

The present disclosure is directed to a device for use in positioning and repositioning a patient during spinal surgery. More specifically, the present disclosure is related to an adjustable device that provides for adjustability in the coronal plane.

In spinal surgeries, surgeons access the anterior of the spine to remove a disk or other bone structure. The removed bone structure is replaced with a spacer referred to in the art as a cage. In some cases, it may be necessary to access the posterior of the spine to install fixation hardware such as screws and rods. With access to both sides of the spine being required in a single procedure, the patient is generally positioned in a lateral position for the anterior approach. The patient is then repositioned in a prone position on a device that allows the abdomen to hang freely in a decompressed state.

Repositioning of the patient generally requires that the patient be moved relative to a supporting device, such as an operating table, for example. Such repositioning requires considerable effort on the part of caregivers to move the patient without complicating the procedure. A type of surgical table has been developed to assist with this rotation of the patient from the lateral to the prone position while also minimizing frame members to facilitate easy access in both approaches.

However, the need to rotate the patient, and the associated pausing of the surgery and need for adjustment of equipment, lines, and patient position results in extending the length of the time the patient is subjected to anesthesia and potentially problematic support structures. There is also a concern with the safety of the patient and the caregivers in making the patient turn, especially in larger patients.

There is therefore a need to support a patient in a manner that reduces the length of time surgery and the risk of injury to the patient and caregivers during any repositioning. However, it is important that the patient be repositionable while being provided sufficient stability during all facets of the procedure, including providing access to the iliac crest and lower ribs to provide access to the lower lumbar vertebra, adjustment in the coronal plane, and providing counter pressure when working from a lateral approach. A need to address all of these issues is important to providing a viable solution, while also providing radiolucency so that x-rays may be taken during the procedure to confirm proper prosthetic placement and confirming the status of progress of the procedure.

SUMMARY

The present disclosure includes one or more of the features recited in the appended claims and/or the following features which, alone or in any combination, may comprise patentable subject matter.

According to a first aspect of the present disclosure, a patient positioning system comprises a first patient positioner and a second patient positioner. The first patient positioner includes a base adapted to be positioned on a pair of laterally spaced rails of a patient support apparatus. The first patient positioner also includes an adjustable platform movable relative to the base between a plurality of positions, and a pair of lateral constraints positionable on the adjustable platform between a plurality of positions to engage the opposite lateral sides of the patient's torso and movable with the adjustable platform as it moves relative to the base. The first patient positioning system further includes a patient support assembly configured to engage the anterior of a patient's torso to provide support for the patient when the patient is positioned in a prone position on the patient positioning system, and a lock configured to selectively lock the adjustable platform relative to the base.

The second patient positioner includes a base adapted to be positioned on the pair of laterally spaced rails of a patient support apparatus. The second patient positioner also includes an adjustable platform movable relative to the base between a plurality of positions, a pair of lateral constraints positionable on the adjustable platform between a plurality of positions to engage the opposite lateral sides of the patient's lower body and movable with the adjustable platform as it moves relative to the base. The second patient positioner further includes a patient support assembly configured to engage the anterior of a patient's lower body to provide support for the patient when the patient is positioned in a prone position on the patient positioning system, and a lock configured to selectively lock the adjustable platform relative to the base.

In some embodiments of the first aspect, the base includes a pair of claims, each clamp configured to secure the base to one of the laterally spaced rails.

In some embodiments of the first aspect, the adjustable platforms of the first patient positioner and the second patient positioner are each rotatable relative to their respective bases. In some embodiments, the adjustable platforms of the first patient positioner and the second patient positioner are each movable along a longitudinal axis of their respective base.

In some embodiments of the first aspect, the adjustable platforms of the first patient positioner and the second patient positioner are each movable along a longitudinal axis of their respective base.

In some embodiments of the first aspect, each base is formed to include a plurality of holes engaged by the lock to secure the respective adjustable platform relative to the base. In some embodiments of the first aspect, the adjustable platforms of the first patient positioner and the second patient positioner are each formed to include a plurality of through-holes which are engaged by the lock such that the lock passes through the adjustable bases and is received in a through-hole of the respective base, the engagement of the lock with the through-holes of the respective adjustable platforms and bases securing the adjustable platform to prevent movement relative to the base. In some embodiments, the lateral constraints each include a base that is sized to be positioned in one of the through-holes of the respective adjustable platform to secure the lateral constraint to the adjustable platform.

In some embodiments of the first aspect, the adjustable platforms of the first patient positioner and the second patient positioner are each formed to include a plurality of through-holes, and wherein each of the lateral constraints include a base that is sized to be positioned in one of the through-holes of the respective adjustable platform to secure the lateral constraint to the adjustable platform.

In some embodiments of the first aspect, each patient support assembly includes a plurality of patient supports, each patient support including a base configured to engage the adjustable platform to secure the patient support to the adjustable platform, and wherein each patient support includes a cushion supported on the base, the cushion configured to engage the body of a patient. In some embodiments, the cushion of at least on patient support is adjustable to vary the height of the patient support vary the positon of the patient relative to the movable platform. In some embodiments, the adjustable platforms of the first patient positioner and the second patient positioner are each formed to include a plurality of through-holes, and wherein the base of each patient support includes a protrusion that is configured to be received into one of the through-holes of the adjustable platform to secure the patient support to the adjustable platform.

In some embodiments of the first aspect, the components of the patient positioning system are substantially radiolucent.

In some embodiments of the first aspect, the first patient positioner and second patient positioner are adjustable to cooperate to cause adjustment of the patient's spine in the coronal plane when the patient is supported on the patient positioning system in a prone position. In some embodiments, the first patient positioner and second patient positioner are configured to engage the laterally spaced rails to be selectively movable to vary the distance between the first patient positioner and second patient positioner.

According to a second aspect of the present disclosure, a method is used to reposition a patient on a patient positioning system that includes a first patient positioner and a second patient positioner, each of the patient positioners including a base plate, an adjustable platform movable relative to the base plate, a support assembly supported on the adjustable platform, a lateral constraint assembly positioned on the adjustable platform, and a position lock operable to selectively lock the adjustable platform relative to the base plate. The method comprises the steps of positioning the first and second patient positioners on a patient support apparatus, positioning a patient on the first patient positioner and the second patient positioner in a prone position, the first patient positioner supporting a portion of the patient's torso and the second patient positioner supporting a portion of the patient's lower body. The method further includes the steps of positioning the lateral constraint assembly of the first patient positioner to engage the lateral sides of the patient's torso to secure the patient's torso from lateral movement relative to the first patient positioner and positioning the lateral constraint assembly of the second patient positioner to engage the lateral sides of the patient's lower body to secure the patient's lower body from lateral movement relative to the first patient positioner. The method still further includes the steps of adjusting the adjustable platform of either the first patient positioner or second patient positioner to a first position relative to the respective base plate and engaging the position lock of the respective first patient positioner or second patient positioner to stabilize the patient in a first position relative to the respective first patient positioner or second patient positioner and adjusting the adjustable platform of the other of the first patient positioner or second patient positioner to a first position relative to the respective base plate to adjust the patient's spine in the coronal plane. The method still further includes the step of engaging the position lock of the other of the first patient positioner or second patient positioner to secure the respective first or second patient positioner in the position that adjusts the patient's spine in the coronal plane.

In some embodiments, the method of second aspect further includes the step of adjusting the height of a portion of one of the support assemblies to adjust a portion of the patient's spine in the sagittal plane.

In some embodiments, the method of second aspect further includes the steps of releasing the position lock of one of the first and second patient positioners, moving the adjustable platform of the released first or second patient positioner to a new position to re-adjust the position of the patient's spine in the coronal plane, re-engaging the position lock of the released first or second patient positioner to secure the first or second positioner in the new position.

In some embodiments, the step of adjusting the position of an adjustable platform of either of the first and second patient positioners includes rotating the adjustable platform about a rotation axis of the adjustable platform and moving the rotation axis of the respective adjustable platform linearly relative to the base plate.

In some embodiments, the step of engaging the position lock of either of the first patient positioner or second patient positioner includes aligning one of a plurality of through-holes formed in the respective adjustable platform with one of a plurality of holes formed in the base plate and positioning the position lock through the aligned through-hole of the adjustable platform and into the aligned hole of the base plate to cause the position lock to simultaneously engage both the adjustable platform and the base plate to prevent movement therebetween.

In some embodiments, the step of positioning the lateral constraint assembly of either of the first patient positioner or second patient positioner includes positioning a portion of the lateral constraint assembly in one of the through-holes of the adjustable platform.

In some embodiments, the step of adjusting the height of a portion of one of the support assemblies to adjust a portion of the patient's spine in the sagittal plane includes inflating a portion of the portion of the support assembly to vary the height of the portion of the support assembly.

According to a third aspect of the present disclosure, a patient positioner comprises a base plate, an adjustable platform movable relative to the base plate, a support assembly supported on the adjustable platform, a lateral constraint assembly positioned on the adjustable platform, and a position lock operable to selectively lock the adjustable platform relative to the base plate.

In some embodiments of the third aspect, the support assembly includes a plurality of adjustable patient supports, the patient supports adjustable to a plurality of positions relative to the adjustable platform. In some embodiments, an adjustable patient support is inflatable to change the height of the adjustable patient support.

In some embodiments of the third aspect, the adjustable platform is formed to include a number of through-holes, the through-holes configured to receive portions of the lateral constraint assembly, patient support assembly, and position lock to allow each of the lateral constraint assembly, patient support assembly, and position lock to be positioned in a plurality of positions relative to the adjustable platform.

In some embodiments of the third aspect, the adjustable platform is movable relative to the base plate about a pivot axis of the adjustable platform. In some embodiments, the adjustable platform is movable relative to the base plate along a linear guide formed in the base plate.

In some embodiments of the third aspect, the base plate is formed to include a plurality of holes which are configured to be aligned with the through-holes in the adjustable platform and when the holes in the base and the through-holes in the adjustable platform are aligned, the position lock is positionable through the aligned through-hole of the adjustable platform and into the aligned hole of the base plate such that the position lock engages both the adjustable platform and the base plate to prevent movement therebetween.

In some embodiments of the third aspect, the each of the components of the patient positioner are substantially radiolucent.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
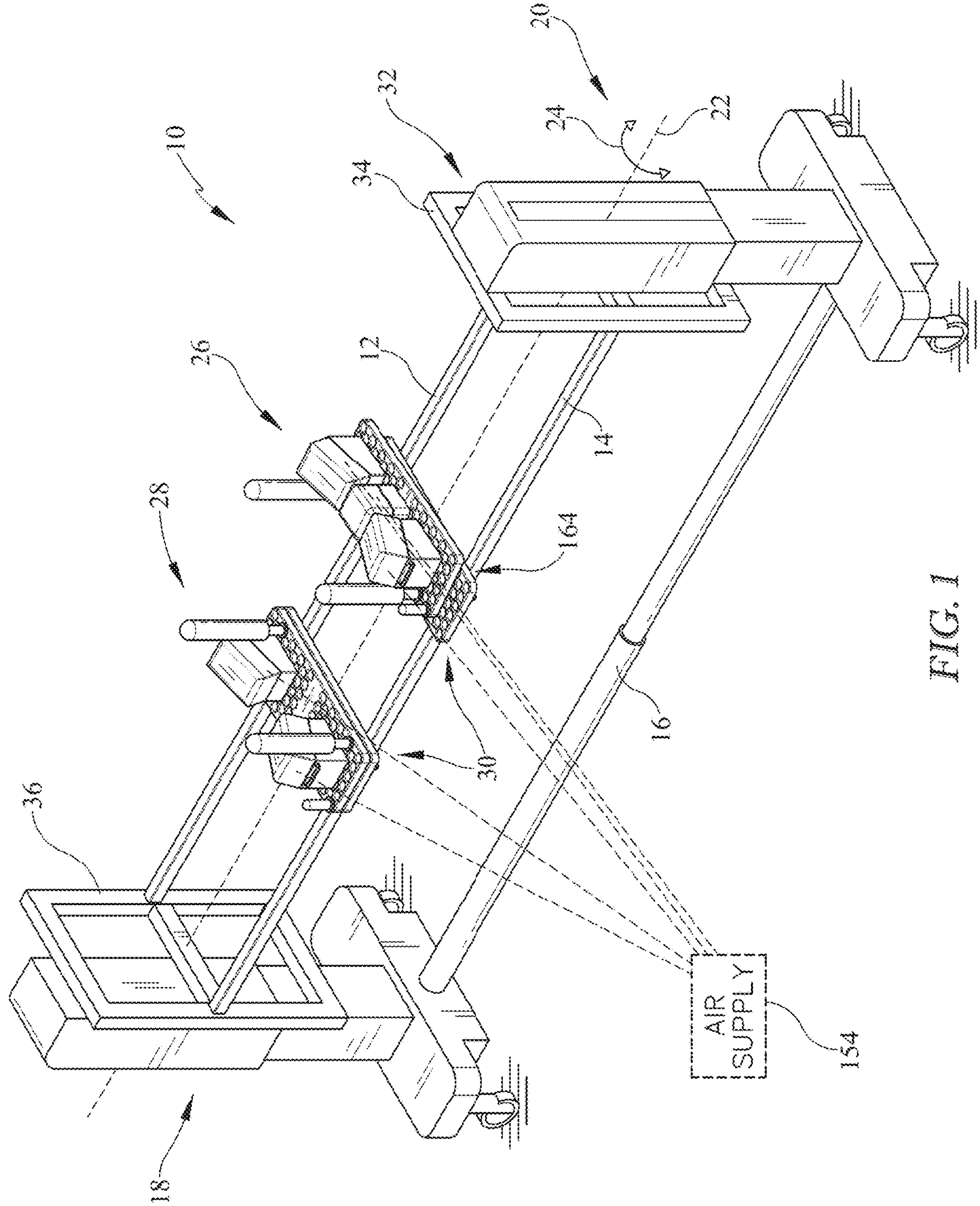
FIG. 1 is a perspective view of a patient support apparatus, embodied as dual column spinal surgical table, with a patient positioning system according to the present disclosure supported on the parallel rails of the patient support apparatus.

A patient support apparatus 10, according to the present disclosure, is embodied as a spinal surgical table and includes support structure 32 that is supported from two columns 18 and 20. The support structure 32 includes a first support frame 34 and a second support frame 36 which support a pair of radiolucent rails 12 and 14 and extend between the support frames 34 and 36. The columns 18 and 20 are also connected by a base rail 16. The support structure 32 is pivotably coupled to the columns 18 and 20 such that the support structure 32 is rotatable about a longitudinal axis 22 as indicated by an arrow 24. The structure of the spinal surgical table 10 is typical in the art and may be embodied as the patient support apparatus 10 disclosed in U.S. Pat. No. 9,498,397 issued Nov. 22, 2016 and titled "DUAL COLUMN SURGICAL SUPPORT SYSTEM," which is incorporated by reference herein for the disclosure of a patient support apparatus 10 according to the present disclosure.

FIG. 1 shows the patient support apparatus 10 supporting a patient positioning system 30 with a first patient positioner 26 adapted to support the torso of a patient in a prone position positioned longitudinally spaced apart from a second patient positioner 28 adapted to support the hips of a patient in a prone position. The patient positioning system 30 is positionable on the rails 12, 14 of the patient support apparatus 10, but may be used with any patient support apparatus 10 that is adapted for spinal surgery that provides a pair of rails that stably support a patient on rails from the hips through the torso, thereby allowing sufficient access for lateral and prone approaches to the spine. The present embodiment of the patient positioning system 30 will be described in detail, however, it should be understood that the motions achieved by the system 30 may also be achieved using other embodiments and implementations to provide a patient positioning system that allows for adjustment of the patient's spine during a procedure in the coronal, sagittal, and axial planes of a patient 38.

Figure 2:
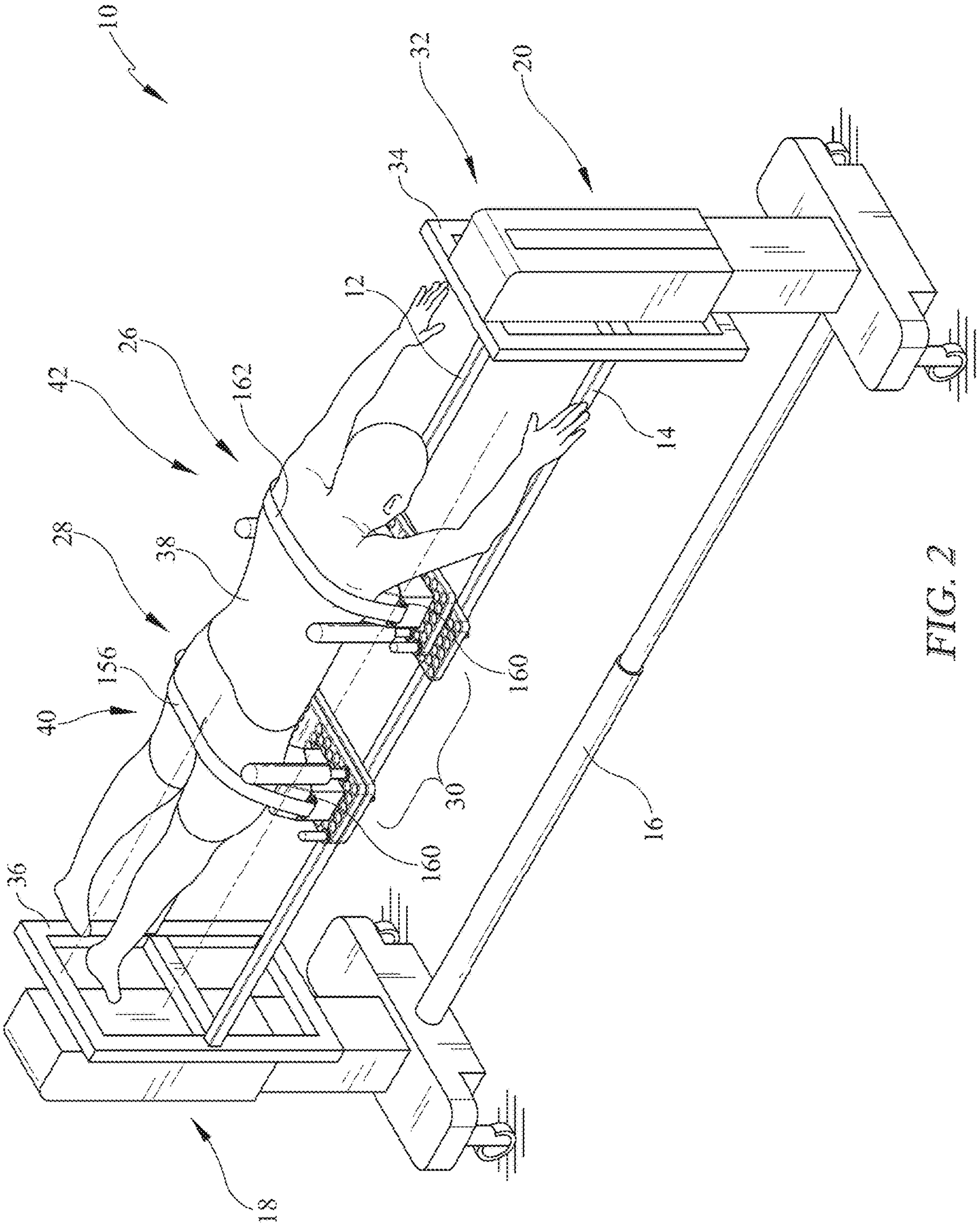
FIG. 2 is view similar to FIG. 1 with a patient supported on the patient positioning system.
Figure 3:
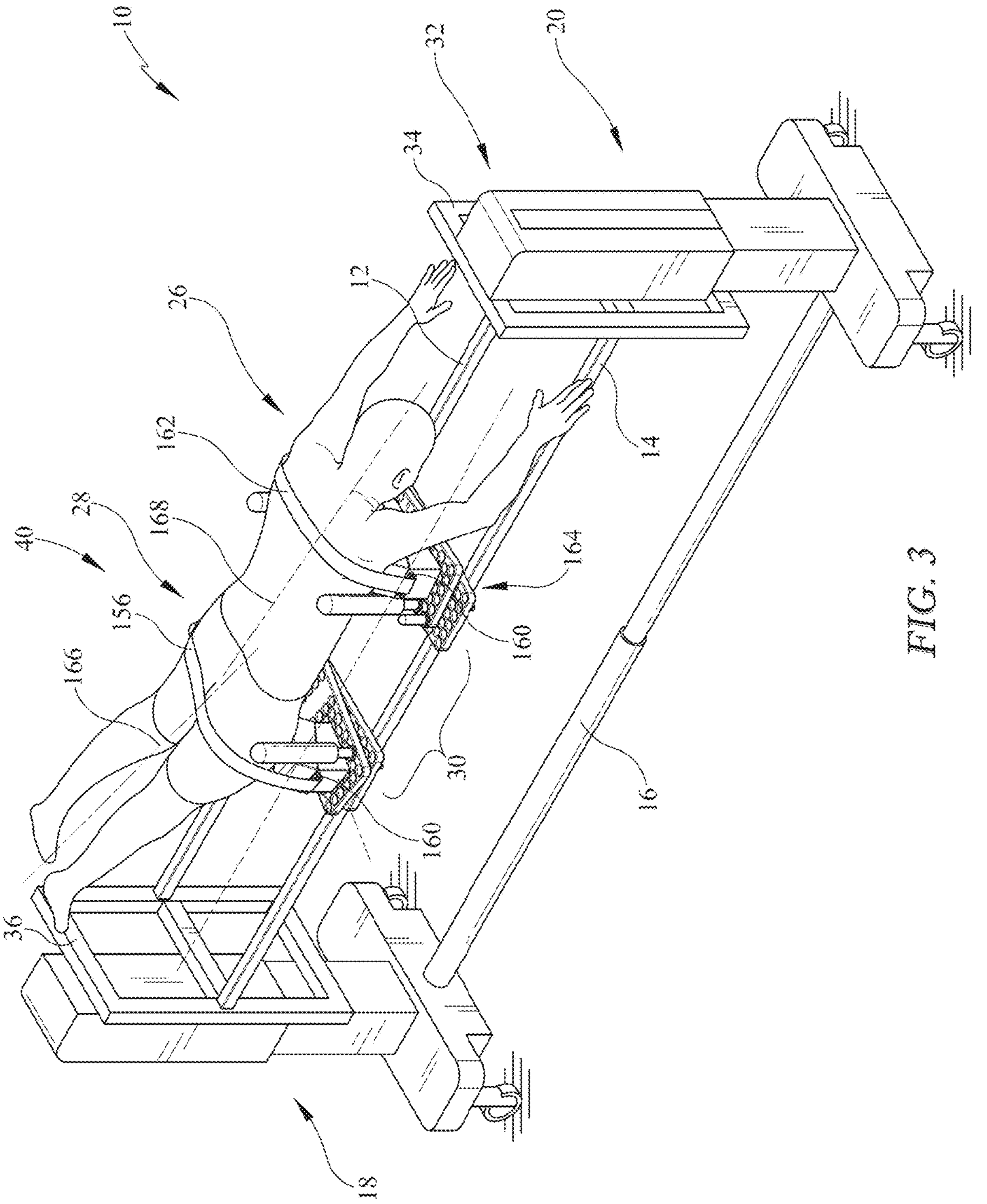
FIG. 3 is a view similar to FIG. 2 with the patient's lower body repositioned using the patient positioning system to adjust the orientation of the patient's spine in the coronal plane.

Referring now to FIGS. 2 and 3, a patient is shown positioned on the patient positioning system 30 in a prone position. Notably, other supports and structures necessary to support the head, arms, and legs of the patient are omitted for simplicity. Those of ordinary skill in the art will recognize the additional support and equipment necessary to support the patient during spinal surgery will complement the patient positioning system 30. While a patient 38 is shown in a neutral prone position in FIG. 2, the patient 38 has been repositioned in FIG. 3 to cause the lower body 40 of the patient 38 to be rotated relative to the torso 42 of the patient 38 in the coronal plane, while maintaining the patient 38 in a generally prone position. While the specific structure of each of the patient positioners 26 and 28 will be described in further detail below, the structure of the positioners 26 and 28 will allow for adjustability of the patient in three planes to correct for deformations of the patient's spine and allow access to difficult areas, such as the lower lumbar region of the patient. The patient positioners 26 and 28 are adjustable to be adaptable to varying patient anatomies in both the prone and lateral positions. This includes an ability to adjust the height of portions of the patient positioners 26 and 28 while the patient 38 is in the prone position to allow for adjustment of the sagittal and axial planes of the spine of the patient 38, or to add tilt to the patient 38 when the patient support apparatus 10 has reached a motion limit. Those of skill in the art will appreciate how the structures and features of the patient positioners 26 and 28 discussed below will allow for robust adjustment of the patient position, during a procedure, with simple adjustments by the caregivers.

Figure 4:
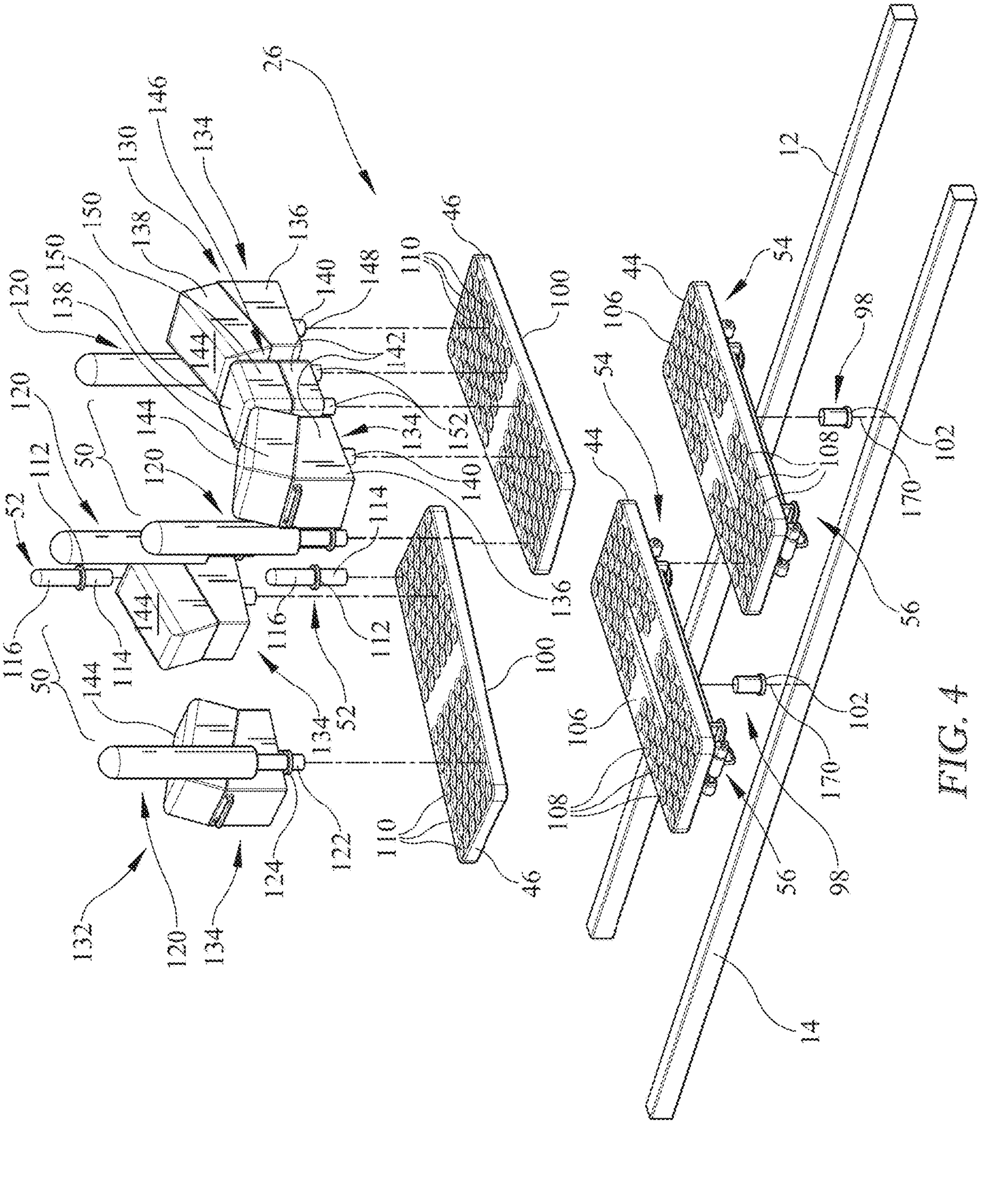
FIG. 4 is an exploded assembly view of the patient positioning system of FIG. 1.

Referring now to FIG. 4, the patient positioners 26 and 28 are shown in an exploded view with each positioner 26, 28 having five key elements including a base plate 44, an adjustable platform 46, respective support assemblies 130, 132, a lateral constraint assembly 50, and a position lock 52. While there is some potential variability between the arrangement of the support assemblies 130, 132 depending on the location of the positioner 26, 28 relative to the body of the patient 38, the operation of the positioners 26, 28 is similar and the following discussion will focus on the positioner 26 as being illustrative of the operation of both positioner 26 and positioner 28.

Figure 9:
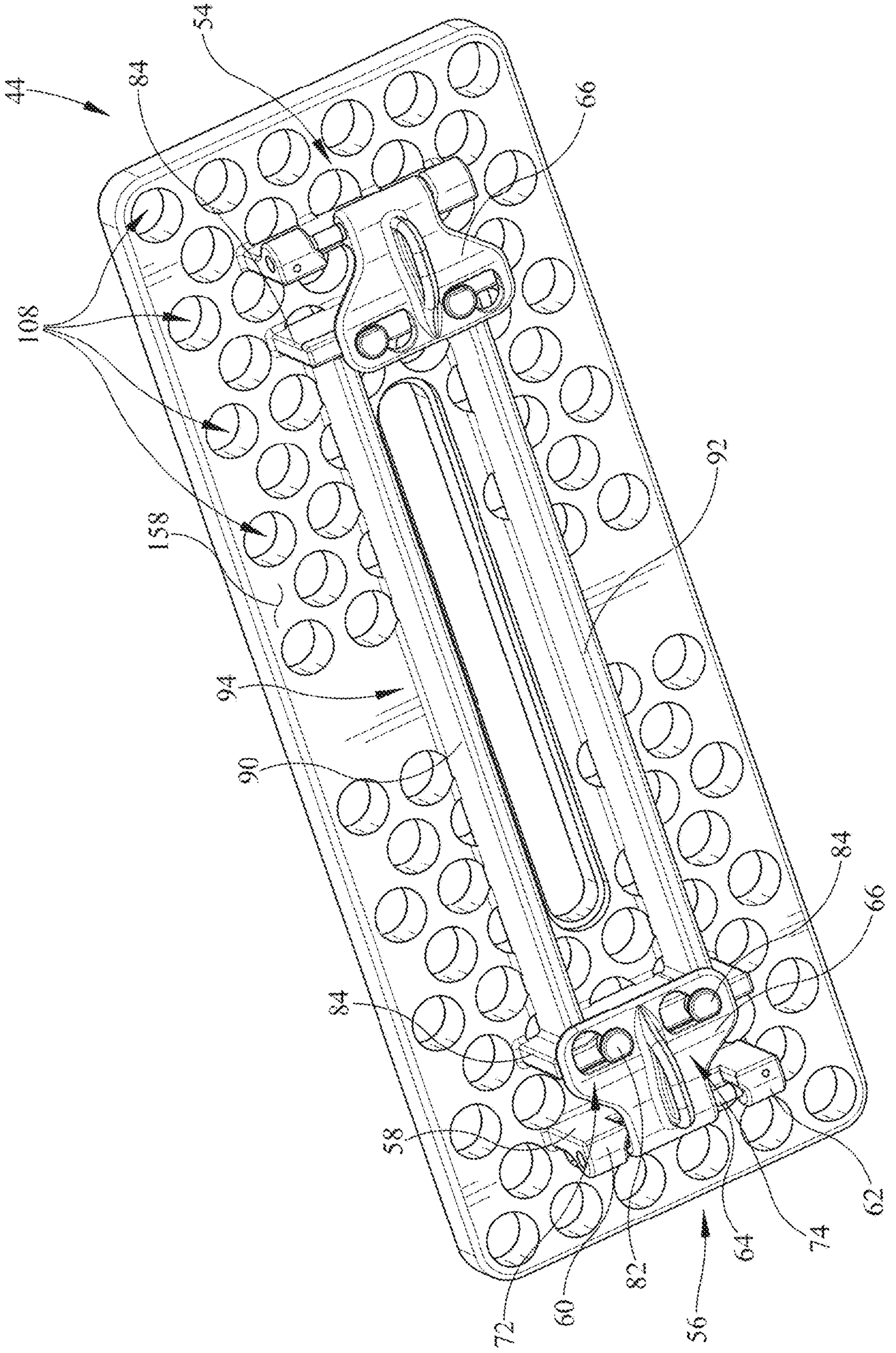
FIG. 9 is a bottom perspective view of the base plate of FIGS. 7 and 8 with the clamp structure in a closed position.
Figure 10:
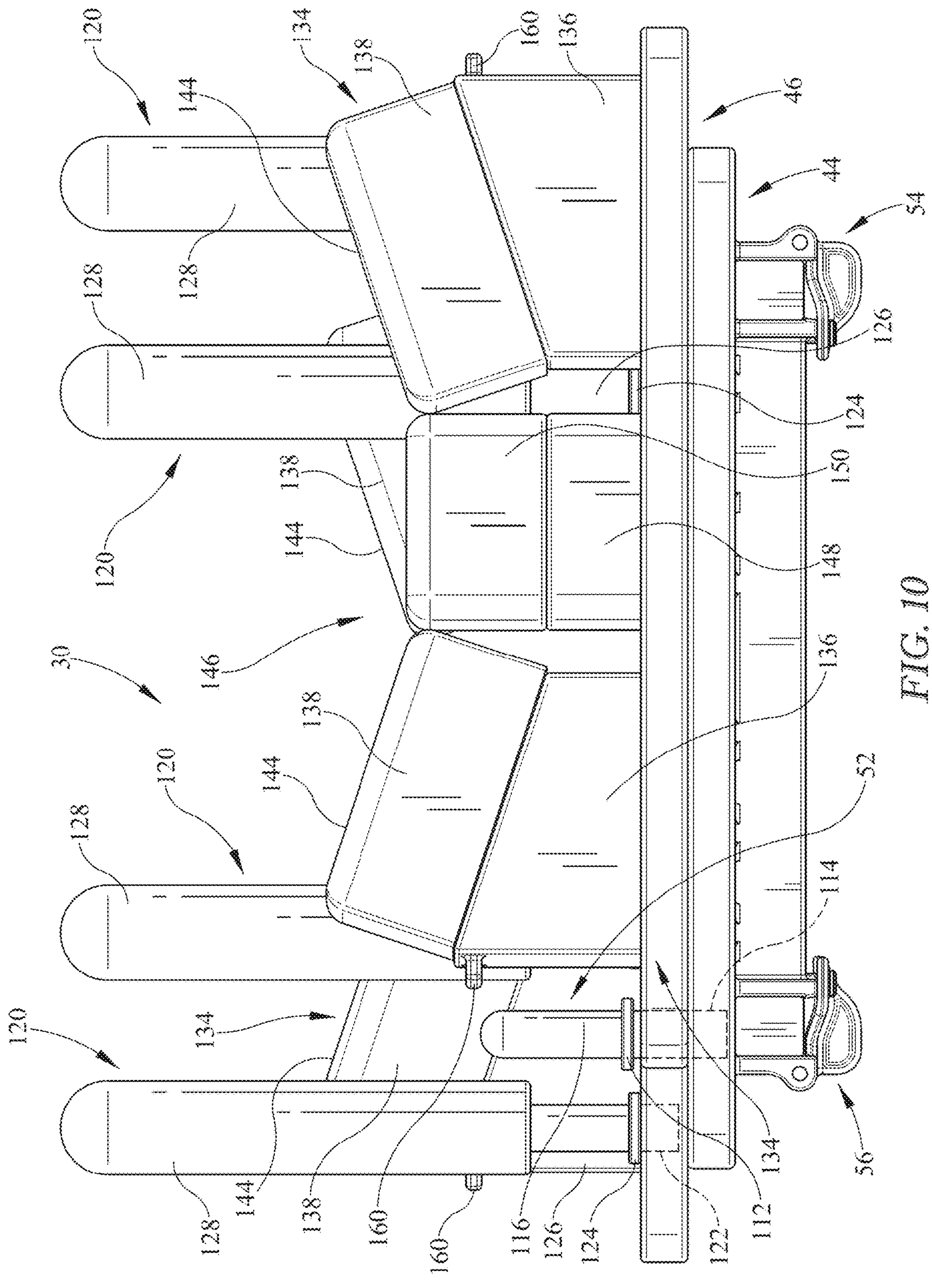
FIG. 10 is a plan view of the patient positioning system viewed along the length of the rails of the patient support apparatus.
Figure 11:
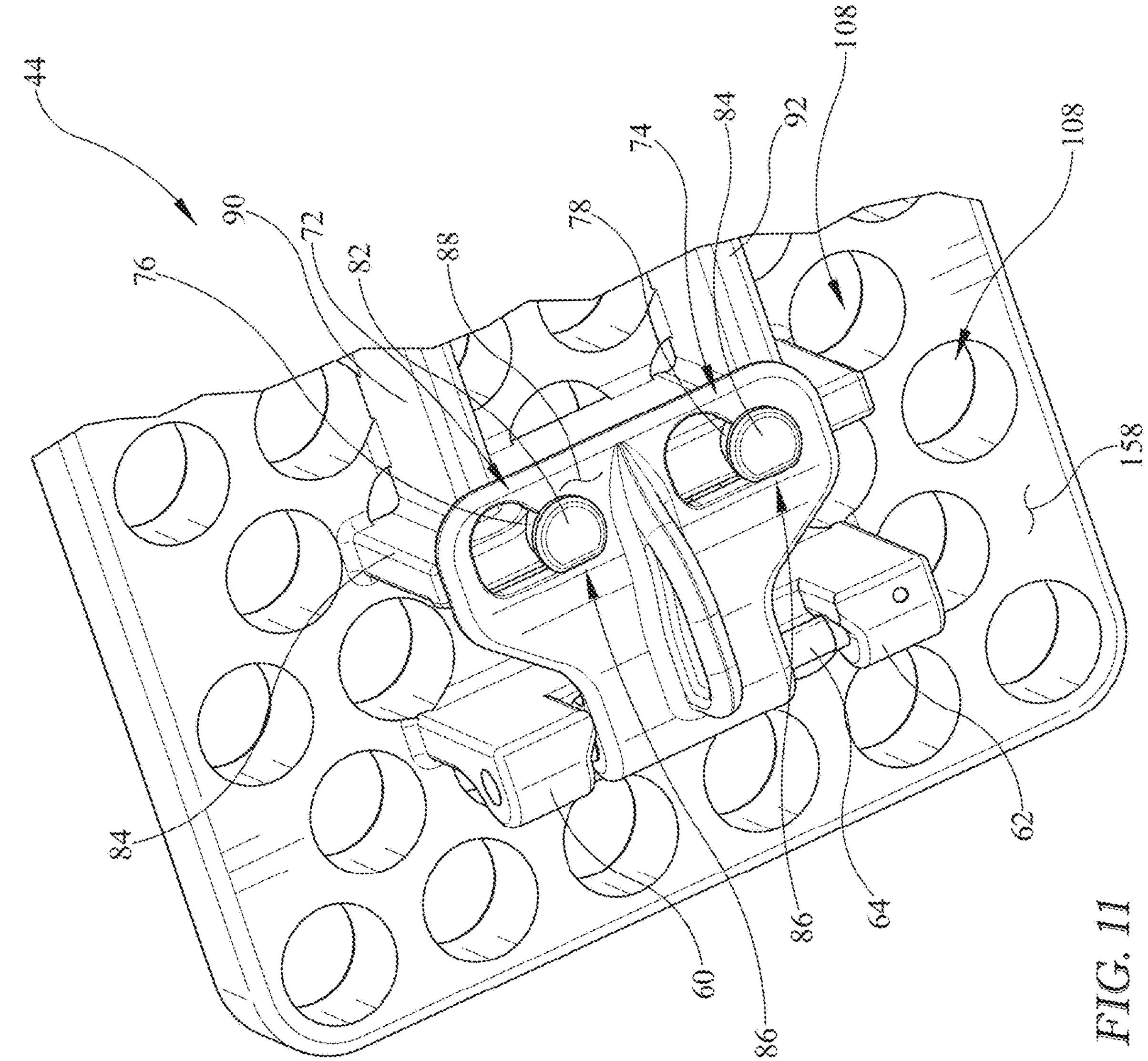
FIG. 11 is an enlarged view of a portion of FIG. 9.

The base plate 44 is fixed to the rails 12, 14 by a pair of clamps 54, 56 that engage the rails 12, 14 respectively. Once closed, the clamps 54, 56 secure the base plate 44 to the rails 12, 14 with sufficient force to prevent movement of the base plate 44 relative to the rails 12, 14 under normal conditions. Referring now to FIG. 7, the clamps 54, 56 each include a clamp base 58 which extends from a lower surface 158 of the base plate 44. The clamp base 58 includes a pair of pivot cradles 60, 62 which are configured to receive a pivot pin 64 about which a clamp arm 66 pivots to engage a respective underside 68, 70 (see FIG. 6) of the rails 12, 14. The clamp arm 66 includes a pair of key-hole receivers 72, 74 which engage pegs 76, 78 of clamp grip 80 when the clamp arm 66 is moved to a closed position as shown in FIGS. 9-11, for example.

To secure the base plate 44 to the rails 12, 14, the clamp arm 66 is pivoted about the pivot pin 64 to cause the key-hole receivers 72, 74 to overlie the pegs 76, 78. The pegs 76, 78 each include a respective cap 82, 84 and the clamp arm 66 is translatable along the pivot pin 64 to cause a narrower region 86 of each of the key-hole receivers 72, 74 to engage the pegs 76, 78 so that the caps 82, 84 each engage a surface 88 of the clamp arm 66. As the narrower region 86 of the key hole receivers 72, 74 engages the pegs, 76, 78, the friction therebetween causes the clamp arm 66 to be secured to the pegs 76, 78 through an interference fit. In some embodiments, the clamp base 58 is flexibly resilient and the force of engaging the receivers 72, 74 with the pegs 76, 78 causes the clamp base 58 to deflect so that the clamp 58 and clamp grip 80 engage the sides of the respective rail 12, 14 to cause a frictional engagement that secures the clamp 54, 56 to the respective rail 12, 14. This prevents the base plate 44 from sliding relative to the rails 12, 14 during surgical procedures.

Referring to FIG. 7, each of the clamp grips 88, 88 are engaged with lateral ribs 90, 92 so that the clamp grips 88, 88 and lateral ribs 90, 92 cooperate to provide a stiffening structure 94 of the base plate 44. The base plate 44 is also formed to include a longitudinal channel 96 which acts as a guide for a cylindrical pivot rod 98 (seen in FIG. 4) which extends through the channel 96 and is positioned in a blind hole (not shown) formed in the bottom surface 100 of the adjustable platform 46 with an interference fit. In some embodiments, the pivot rod 98 may be secured to the bottom of the adjustable platform 46 by gluing, ultrasonic welding, or similar joining methods. In still other embodiments, the pivot rod 98 may include male threads that engage with female threads in the hole in the bottom surface 100 of the adjustable platform 46. The pivot rod 98 is formed to include a cap structure 102 that prevents the adjustable platform 46 from being lifted relative to the base plate 44. However, the pivot rod 98 allows the adjustable platform 46 to be moved along the longitudinal channel 96 and the pivot rod 98 facilitates pivoting of the adjustable platform 46 about the axis 170 of the pivot rod 98 relative to the base plate 44, as will be described in further detail below.

Figure 5:
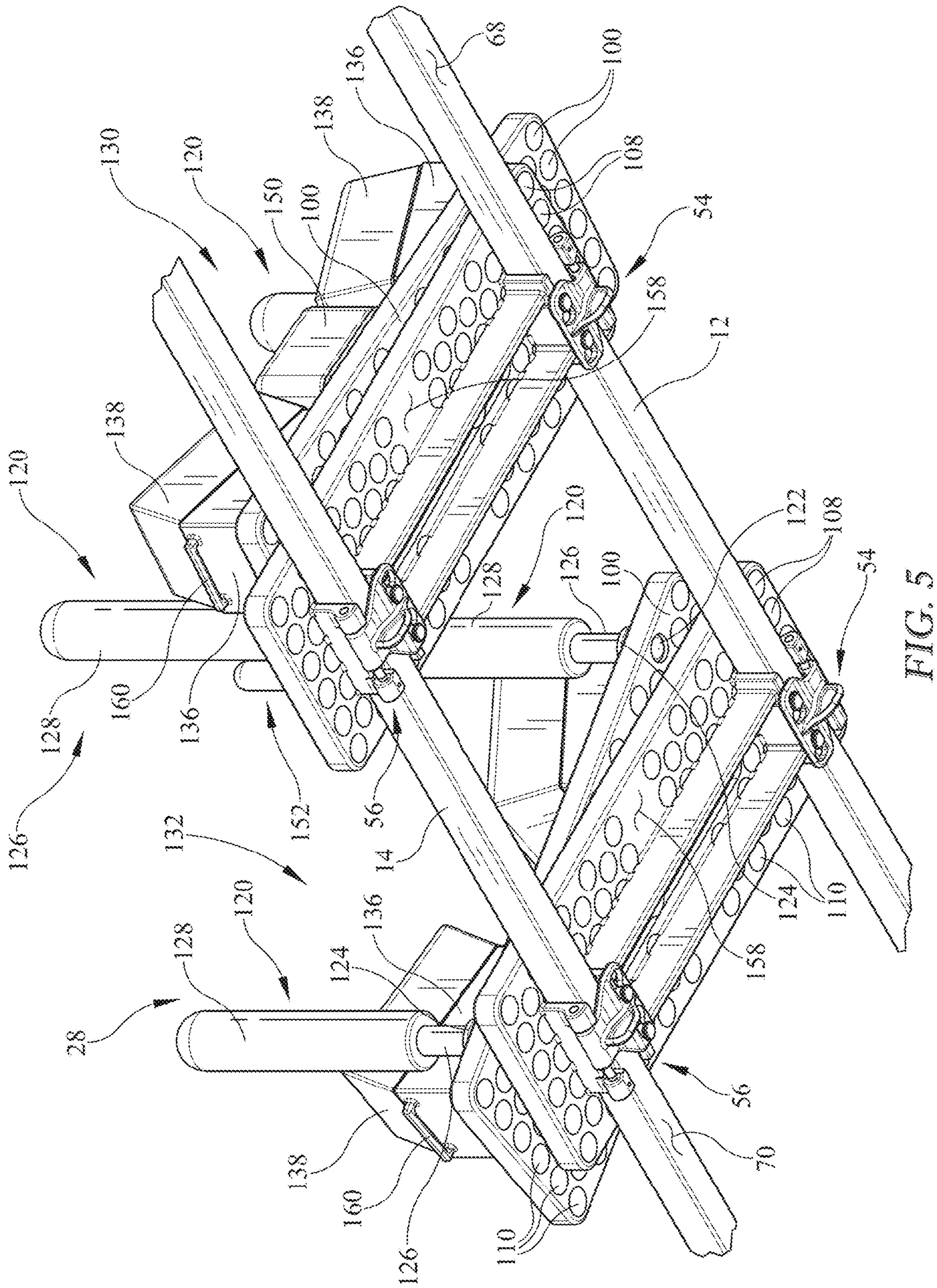
FIG. 5 is a perspective view, with portions cut-away, of the patient positioning system taken from below the rails of the patient support apparatus, the view of FIG. 5 showing a first patient positioner of the patient positioning system configured to support the torso of a patient being positioned on the right and a second patient positioner configured to support the lower body of a patient positioned on the left.
Figure 6:
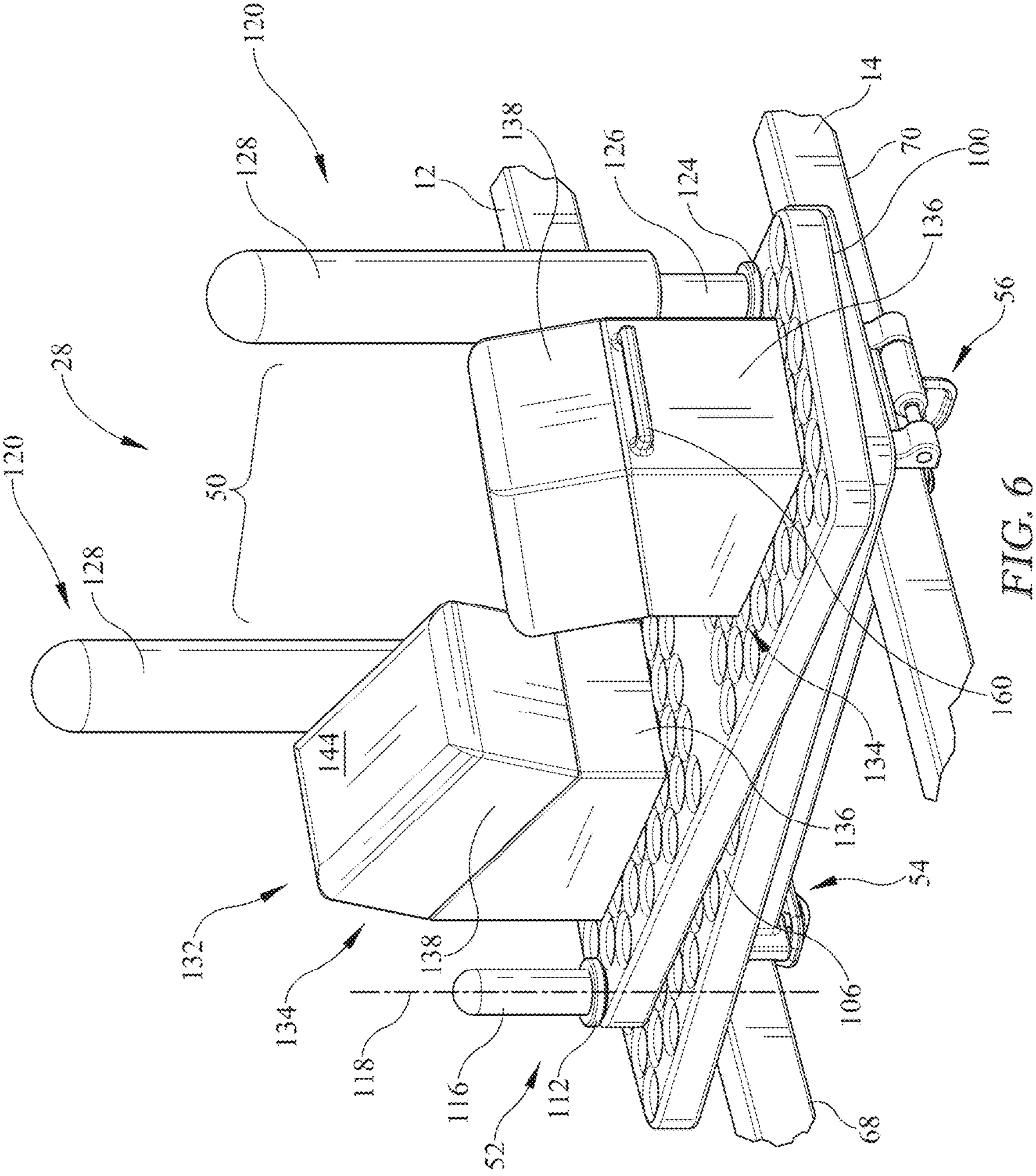
FIG. 6 is a perspective view with portions cut-away of the second positioner of FIG. 5, the second positioner being adjusted to a second position.
Figure 7:
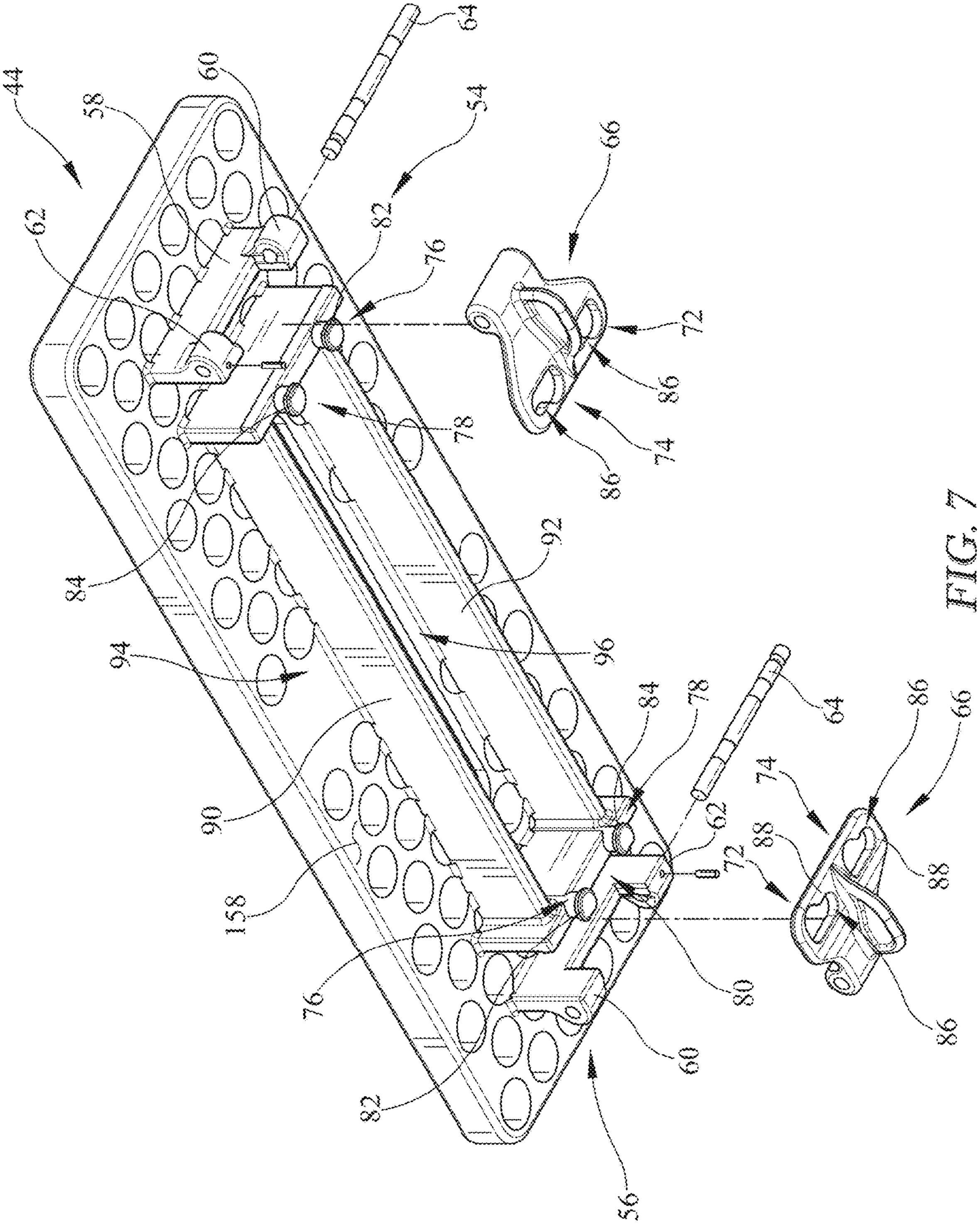
FIG. 7 is an exploded assembly view of the clamping structure of the base plate of one of the first and second patient positioners.
Figure 8:
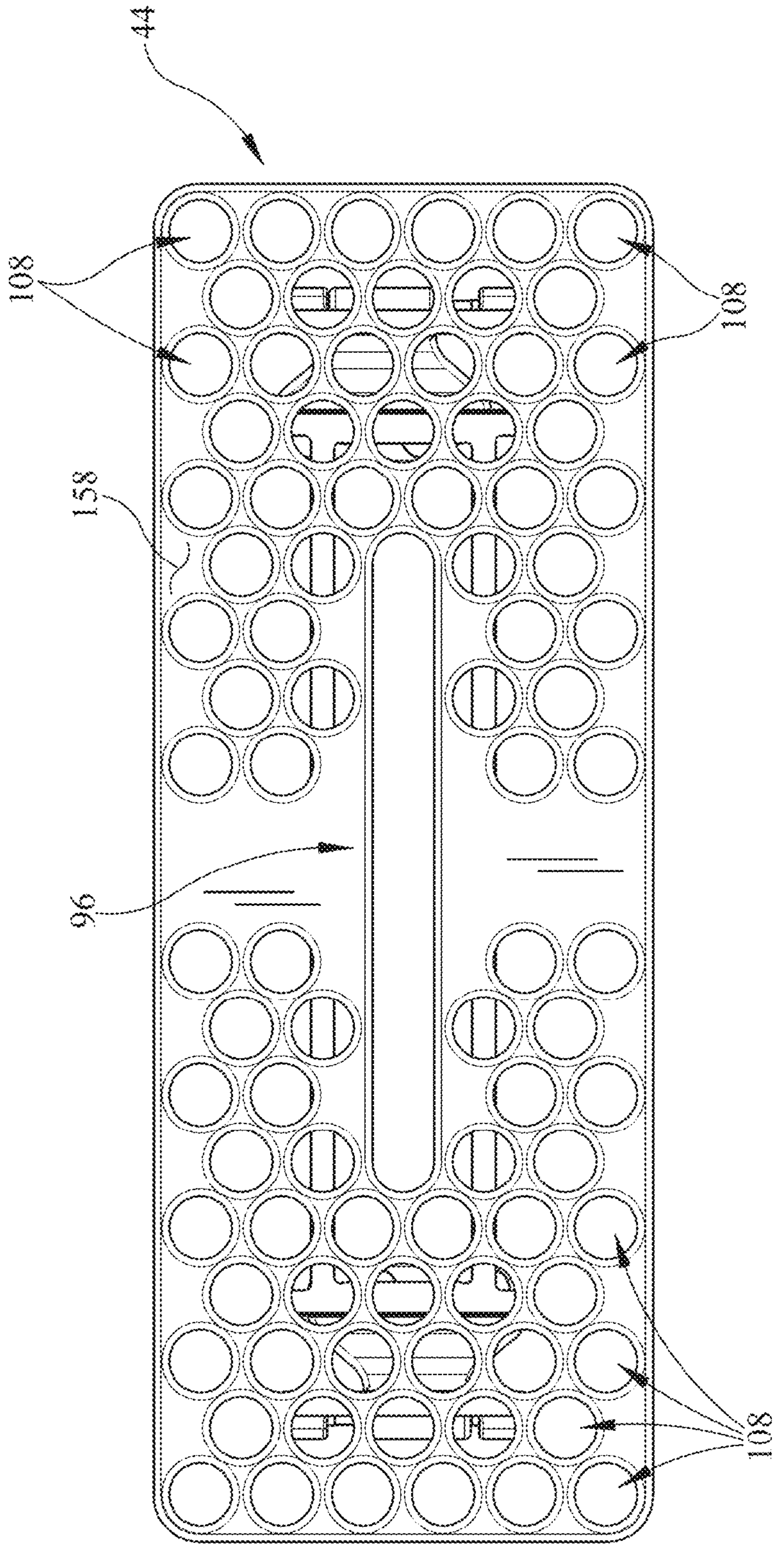
FIG. 8 is a top view of the base plate common to both the first and second patient positioners.

With reference to FIGS. 4-6, the adjustable platform 46 is positionable on the base plate 44 so that the lower surface 100 of the adjustable platform 46 contacts an upper surface 106 of the base plate 44. The adjustable platform 46 and base plate 44 are constructed of a radiolucent material, such ABS or another carbon fiber reinforced polymer, such that the interface between surfaces 100 and 106 has a relatively low coefficient of friction and the adjustable platform 46 will move freely relative to the base plate 44. Movement of the adjustable platform 46 relative to the base plate 44 is constrained by the movement of the pivot rod 98 in the channel 96.

To secure the adjustable platform 46 relative to the base plate 44, the position lock 52 is positioned to engage both the adjustable platform 46 and the base plate 44. The action of the position lock 52 in combination with the pivot rod 98 precludes movement of the adjustable platform 46 relative to the base plate 44. As shown in FIG. 6, the base plate 44 and adjustable platform 46 are each formed to include a number of respective through-holes 108, 110 formed through the base plate 44 and adjustable platform 46. The pattern of the through-holes 108, 110 in each of the base plate 44 and adjustable platform 46 is similar and as the adjustable platform 46 is moved relative to the base plate 44, a through-holes 110 in the adjustable platform 46 is aligned with a through-hole 108 in the base plate 44 and a shaft 114 (see FIG. 4) of the position lock 52 is inserted through the through-hole 110 in the adjustable platform 46 into the aligned through-hole 108 in the base plate 44 so that the position lock 52 securely engages with both the adjustable platform 46 and base plate 44.

The position lock 52 is formed to include a collar 112 which limits the movement of the shaft 114 into the adjustable platform 46. A body 116 of the position lock 52 has a rounded top to prevent injury to the patient 38 during repositioning. The body 116 acts as a handle when the position lock 52 is being positioned into the through-holes 108 and 110. Once the position lock 52 is positioned to secure the adjustable platform 46 to the base plate 44, any movement is limited to pivoting about an axis 118 of the position lock 52. However, because the pivot rod 98 is also engage with both the adjustable platform 46 and base plate 44, the adjustable platform 46 is precluded from pivoting about the axis 118 and, thereby, is prevented from any movement relative to the base plate 44. Through proper sizing and distribution of the through-holes 108 and 110, the position of the adjustable platform 46 can be moved to any of a number of positions to allow for adjustment of the patient 38 in the coronal plane. It should be understood that the size of the through-holes 108, 110 and the pattern of the through-holes 108 or 110 may be varied to vary the number of positions of the adjustable platform 46 relative to the base plate 44 and the arrangement disclosed in the figures is for illustrative purposes only. Likewise, the size and shape of the channel 96 and pivot rod 98 could also be varied to vary the available positions. For example, in some embodiments, the channel 96 may have a curvilinear shape.

Referring again to FIGS. 1-4, the lateral constraint assembly 50 of each patient positioner 26, 28 includes a pair of posts 120, 120 that act as lateral constraint for the patient 38 as will be described in further detail below. Each post 120 includes a base 122, a collar 124, and a shaft 126. Each shaft 126 supports a pad 128 positioned on the shaft 126 and configured to engage a lateral side of patient 38 as shown in FIGS. 2 and 3. The base 122 of each post 120 is configured to be securely positioned in one of the through-holes 110 of the adjustable platform 46. The collar 124 limits the engagement of the post 120 so that the base 122 does not extend through the adjustable platform 46, and therefore does not engage the base plate 44, as suggested in FIGS. 5 and 6.

Referring again to FIG. 4, the patient positioners 26 and 28 also include respective support assemblies 130, 132. Both support assemblies 130, 132 include a pair of lateral patient supports 134, 134. The lateral supports 134 in the illustrative embodiment are similar and vary only in their position and orientation. Each lateral support 134 includes a base 136 and a cushion 138. As seen in FIG. 4, each base 136 includes a plurality of protrusions 140 which extend from the bottom 142 of the base 136 and are received in through-holes 110 in the adjustable platform 46 to locate and secure the patient support 134 to the adjustable platform 46. Referring to FIGS. 2 and 3, the lateral supports 134 are positionable to support the patient 38 in the prone position and have an angled upper surface 144 that also provides some lateral support to the patient 38.

The support assembly 130 further includes a central patient support 146 that is positionable between the lateral patient supports 134, 134 to provide additional support to the torso 42 of the patient 38 as suggested in FIGS. 2 and 3. The central patient support 146 also includes a base 148, a cushion 150, and a pair of protrusions 152 that are positionable in through-holes 110 to secure the central patient support 146 to the adjustable platform 46. Generally, the central patient support 146 is positioned to support the sternum of the patient 38, while the lateral patient supports 134, 134 engage the ribs of the patient 38.

The cushions 138 and 150 of the lateral patient support 134 and central patient support 146 comprise encapsulated foam as is known in the art of spinal surgery. However, in some embodiments, the cushions 138 and 150 may include or be fully embodied as air bladders that allow adjustment of the height of the cushions 138, 150 during a procedure. For example, an optional air system 154, shown in FIG. 1, may be operatively connected to the cushions 138, 150 to control a flow of pressurized air into and out of the cushions 138, 150 to adjust the height of the cushions 138, 150. This adjustability allows for the spine of the patient 138 to be adjusted in the sagittal plane and axial plane during a procedure, for example. It should be understood that the clamps 54 and 56 of either positioner 26 or 28 may be released and adjusted during the procedure to change the distance between the positioners 26 and 28 along the rails 12, 14 to make adjustments in the axial plane. The optional air system 154 includes a source of pressurized air, such as a compressor, for example. The optional air system 154 also includes a controller, valves, manifold, and conduits necessary to control a flow pressurized air into and out of the cushions as is known in the art.

With this understanding of the patient positioners 26 and 28, a brief description of the use case for the patient positioners 26 and 28 can be provided. As shown in FIG. 1, the positioners 26 and 28 are positioned on a patient support apparatus 10. It would generally be expected that the adjustable platform 46 would be locked to the base plate 44, the lateral patient supports 134 and central patient support 146 would be positioned based on the anthropometry of the patient 38, and the lateral constraints 120 would be removed to allow for a patient 38 to be transferred to the positioners 26 and 28. As shown in FIG. 1, the adjustable platform 46 of the positioner 26 is offset by an amount 164 before the patient 38 is positioned. Other similar adjustments could be made pre-positioning as required by the anatomy of the patient 38 or as appropriate for a particular procedure.

Once the patient 38 is positioned on the positioners 26 and 28, as shown in FIG. 2, the lateral constraints 120 are positioned to by placing the base 122 into a through-hole 110 of the adjustable platform 46 so that the pad 128 of each respective lateral constraint 120 engages a lateral side of the patient 38. Then, the patient 38 is secured by positioning a first strap 156 over the lower body 40 of the patient 38 and securing the strap 156 to grips 160 formed in the base 136 of each of the lateral patient supports 134. A second strap 162 is secured over the torso 42 of the patient 38. As noted above, the other support structures necessary to support the patient are omitted from the present disclosure, but are well understood by those of ordinary skill in the art.

Once the patient is properly positioned and secured as depicted in FIG. 2, the combination of the patient positioning system 30 and the patient support apparatus 10 provide for several potential adjustments of the position of the patient 38 throughout the progression of a procedure. For example, the cushions 138, 150 of the patient supports 134, 146 may be inflated during the procedure to adjust the patient's spine in the sagittal plane. The support structure 32 of the patient support apparatus 10 may be rotated about the axis 22 to move the patient 38 from a prone to lateral position. In addition, one or both of the patient positioners 26 and 28 may be adjusted to provide adjustment of the patient's spine in the coronal plane. For example, the position lock 52 of the positioner 28 is removed in FIG. 3 to allow the adjustable platform 46 to be rotated relative to the base plate 44 offsetting the axis 166 of the lower body 40 in the coronal plane to the axis 168 of the torso 42 in the coronal plane. While not shown, the position lock 52 is then replaced to constrain the patient 38 in the position shown in FIG. 3 to allow for progression of a procedure. Thus, the patient positioning system 30 cooperates with the patient support apparatus 10 to provide a simple, safe, and quick approach for positioning and adjusting the position of the spine of the patient 38 in both the coronal, sagittal, and axial planes during a lateral-prone spinal surgery procedure.

While the present disclosure details a specific embodiment, it should be understood that the motions provided by the patient positioning system 30 during a procedure may accomplished using other structures for controlling the motion between the base plate 44 and the adjustable platform 46. For example, the position lock 52 may be omitted and a releasable frictional or suction lock may be implemented to secure the adjustable platform 46 from movement relative to the base plate 44. The motions may also be mechanized by either electrical or hydraulic actuators which provide internal locking. Still further, a combination of actuators may be used such that one rotates the adjustable platform 46 and another moves the adjustable platform 46 laterally relative to the base plate 44.

The disclosed embodiment is contemplated to be substantially radiolucent using components and materials well known in the art. However, one or more of the components may not be radiolucent depending on the application.

Although this disclosure refers to specific embodiments, it will be understood by those skilled in the art that various changes in form and detail may be made without departing from the subject matter set forth in the accompanying claims.

The invention claimed is:

1. A method of repositioning a patient on a patient positioning system that comprises a first patient positioner and a second patient positioner, each of the patient positioners including a base plate, an adjustable platform movable relative to the base plate, a support assembly supported on the adjustable platform, a lateral constraint assembly positioned on the adjustable platform, and a position lock operable to selectively lock the adjustable platform relative to the base plate, the method comprising:

positioning the first and second patient positioners on a patient support apparatus by securing the respective base plates to laterally spaced rails of the patient support apparatus in a fixed position;

positioning a patient on the first patient positioner and the second patient positioner in a prone position, the first patient positioner supporting a portion of a torso of the patient and the second patient positioner supporting a portion of a lower body of the patient;

positioning the lateral constraint assembly of the first patient positioner to engage lateral sides of the torso of the patient to secure the torso of the patient from lateral movement relative to the first patient positioner;

positioning the lateral constraint assembly of the second patient positioner to engage the lateral sides of the lower body of the patient to secure the lower body of the patient from lateral movement relative to the second patient positioner;

adjusting the adjustable platform of either the first patient positioner or second patient positioner to a first position relative to the respective base plate and engaging the position lock of the respective first patient positioner or second patient positioner to stabilize the patient in a first position relative to the respective first patient positioner or second patient positioner;

adjusting the adjustable platform of the other of the first patient positioner or second patient positioner to a first position relative to the respective base plate to adjust the spine of the patient in a coronal plane; and engaging the position lock of the other of the first patient positioner or second patient positioner to secure the respective first or second patient positioner in the position that adjusts the spine of the patient in the coronal plane.

2. The method of claim 1, further comprising the step of: adjusting a height of a portion of one of the support assemblies to adjust a portion of the spine of the patient in a sagittal plane.

3. The method of claim 2, further comprising the steps of:

releasing the position lock of one of the first and second patient positioners;

moving the adjustable platform of the released first or second patient positioner to a new position to re-adjust the position of the spine of the patient in the coronal plane; and re-engaging the position lock of the released first or second patient positioner to secure the first or second positioner in the new position.

4. The method of claim 3, wherein the step of adjusting the position of an adjustable platform of either of the first and second patient positioners includes rotating the adjustable platform about a rotation axis of the adjustable platform and moving the rotation axis of the respective adjustable platform linearly relative to the base plate.

5. A method of repositioning a patient on a patient positioning system that comprises a first patient positioner and a second patient positioner, each of the patient positioners including a base plate, an adjustable platform movable relative to the base plate, a support assembly supported on the adjustable platform, a lateral constraint assembly positioned on the adjustable platform, and a position lock operable to selectively lock the adjustable platform relative to the base plate, the method comprising:

positioning the first and second patient positioners on a patient support apparatus;

positioning a patient on the first patient positioner and the second patient positioner in a prone position, the first patient positioner supporting a portion of a torso of the patient and the second patient positioner supporting a portion of a lower body of the patient;

positioning the lateral constraint assembly of the first patient positioner to engage lateral sides of the torso of the patient to secure the torso of the patient from lateral movement relative to the first patient positioner;

positioning the lateral constraint assembly of the second patient positioner to engage the lateral sides of the lower body of the patient to secure the lower body of the patient from lateral movement relative to the second patient positioner;

adjusting the adjustable platform of either the first patient positioner or second patient positioner to a first position relative to the respective base plate and engaging the position lock of the respective first patient positioner or second patient positioner to stabilize the patient in a first position relative to the respective first patient positioner or second patient positioner;

adjusting the adjustable platform of the other of the first patient positioner or second patient positioner to a first position relative to the respective base plate to adjust the spine of the patient in a coronal plane; and engaging the position lock of the other of the first patient positioner or second patient positioner to secure the respective first or second patient positioner in the position that adjusts the spine of the patient in the coronal plane, wherein the step of engaging the position lock of either of the first patient positioner or second patient positioner includes aligning one of a plurality of through-holes formed in the respective adjustable platform with one of a plurality of holes formed in the base plate and positioning the position lock through the aligned through-hole of the adjustable platform and into the aligned hole of the base plate to cause the position lock to simultaneously engage both the adjustable platform and the base plate to prevent movement therebetween.

6. The method of claim 5, wherein the step of positioning the lateral constraint assembly of either of the first patient positioner or second patient positioner includes positioning a portion of the lateral constraint assembly in one of the through-holes of the adjustable platform.

7. The method of claim 6, wherein the step of adjusting the height of a portion of one of the support assemblies to adjust a portion of the spine of the patient in the sagittal plane includes inflating a portion of the portion of the support assembly to vary the height of the portion of the support assembly.

8. The method of claim 1, wherein the first and second patient positioners each include a pair of clamps supporting the base plate, and wherein the step of positioning the first and second patient positioners on a patient support apparatus by securing the respective base plates to laterally spaced rails of the patient support apparatus in a fixed position includes securing a first clamp to a first rail of the patient support apparatus and securing a second clamp to a second rail of the patient support apparatus to prevent movement of the base plate relative to the first and second rails.

9. A method of repositioning a patient on a patient positioning system that comprises a first patient positioner including a base plate, an adjustable platform movable relative to the base plate, a support assembly supported on the adjustable platform, a lateral constraint assembly positioned on the adjustable platform, and a position lock operable to selectively lock the adjustable platform relative to the base plate, the method comprising:

positioning the first patient positioner on a patient support apparatus by securing the base plate to laterally spaced rails of the patient support apparatus in a fixed position;

positioning a patient on the first patient positioner in a prone position, the first patient positioner supporting a portion of a body of the patient;

positioning the lateral constraint assembly of the first patient positioner to engage the lateral sides of the body of the patient to secure the body of the patient from lateral movement relative to the first patient positioner;

adjusting the adjustable platform of the first patient positioner to a first position relative to the respective base plate and engaging the position lock of the respective first patient positioner to stabilize the patient in a first position relative to the respective first patient positioner.

10. The method of claim 9, further comprising the step of:

adjusting a height of a portion of the first patient positioner to adjust a portion of the spine of the patient in the sagittal plane.

11. The method of claim 10, further comprising the steps of:

releasing the position lock of the first patient positioner;

moving the adjustable platform of the released first patient positioner to a new position to re-adjust the position of the patient's spine in the coronal plane; and re-engaging the position lock of the released first patient positioner to secure the first positioner in the new position.

12. The method of claim 11, wherein the step of adjusting the position of an adjustable platform of the first patient positioner includes rotating the adjustable platform about a rotation axis of the adjustable platform and moving the rotation axis of the adjustable platform linearly relative to the base plate.

13. The method of claim 12, wherein the step of engaging the position lock of the first patient positioner includes aligning one of a plurality of through-holes formed in the respective adjustable platform with one of a plurality of holes formed in the base plate and positioning the position lock through the aligned through-hole of the adjustable platform and into the aligned hole of the base plate to cause the position lock to simultaneously engage both the adjustable platform and the base plate to prevent movement therebetween.

14. The method of claim 13, wherein the step of positioning the lateral constraint assembly of the first patient positioner includes positioning a portion of the lateral constraint assembly in one of the through-holes of the adjustable platform.

15. The method of claim 14, wherein the step of adjusting the height of a portion of the support assembly to adjust a portion of the spine of the patient in the sagittal plane includes inflating a portion of the portion of the support assembly to vary a height of the portion of the support assembly.

16. The method of claim 9, wherein the patient positioner includes a pair of clamps supporting the base plate, and wherein the step of positioning the first patient positioner on a patient support apparatus by securing the base plate to laterally spaced rails of the patient support apparatus in a fixed position includes securing a first clamp to a first rail of the patient support apparatus and securing a second clamp to a second rail of the patient support apparatus to prevent movement of the base plate relative to the first and second rails.

* * * * *